(12) United States Patent
Schlak et al.

(10) Patent No.: US 11,081,738 B2
(45) Date of Patent: Aug. 3, 2021

(54) CONTAINMENT HEATSINK FOR PACKAGED BATTERY CELLS

(71) Applicant: INTERNATIONAL BUSINESS MACHINES CORPORATION, Armonk, NY (US)

(72) Inventors: Robert B. Schlak, Hyde Park, NY (US); Noah Singer, New City, NY (US); John Torok, Poughkeepsie, NY (US); Xiaojin Wei, Poughkeepsie, NY (US); Mitchell Zapotoski, New Paltz, NY (US)

(73) Assignee: International Business Machines Corporation, Armonk, NY (US)

( * ) Notice: Subject to any disclaimer, the term of this patent is extended or adjusted under 35 U.S.C. 154(b) by 392 days.

(21) Appl. No.: 15/912,602

(22) Filed: Mar. 6, 2018

(65) Prior Publication Data

US 2019/0280352 A1    Sep. 12, 2019

(51) Int. Cl.
*H01M 10/613* (2014.01)
*H01M 50/10* (2021.01)
*H01M 10/6554* (2014.01)

(52) U.S. Cl.
CPC ......... *H01M 10/613* (2015.04); *H01M 50/10* (2021.01); *H01M 10/6554* (2015.04)

(58) Field of Classification Search
CPC ............. H01M 10/613; H01M 10/425; H01M 10/6551; H01M 2/02; H01M 2/12; H01M 2/1016
See application file for complete search history.

(56) References Cited

U.S. PATENT DOCUMENTS

| 5,314,765 A | 5/1994 | Bates |
| 5,998,967 A | 12/1999 | Umeki et al. |

(Continued)

FOREIGN PATENT DOCUMENTS

| GB | 2460946 A | 12/2009 |
| WO | 2015130746 A1 | 9/2015 |

OTHER PUBLICATIONS

Pending U.S. Appl. No. 15/682,578, filed Aug. 22, 2017, entitled: "Cooled Containment Compartments for Packaged Battery Cells", 25 pages.

(Continued)

*Primary Examiner* — Edward J. Schmiedel
(74) *Attorney, Agent, or Firm* — Tihon Poltavets

(57) ABSTRACT

An apparatus for cooling and containing packaged battery cells includes a first structure disposed on a printed circuit board for encasing a first battery cell, the first battery cell being electrically coupled to the circuit board, the first structure includes an external surface and an internal surface defining a first cavity in which the first battery cell is located. The apparatus further includes a first seal surrounding the first battery cell between the printed circuit board coupled to the first structure. The apparatus further includes a first thermal interface material located in the first cavity, wherein a first portion of the first thermal interface material is thermally coupled to an interior surface and a second portion of the first thermal interface material is thermally coupled to the first battery cell. The apparatus further includes a plurality of heatsink fins located on the external surface of the first structure.

13 Claims, 5 Drawing Sheets

(56) References Cited

U.S. PATENT DOCUMENTS

| | | | |
|---|---|---|---|
| 6,080,508 A | 6/2000 | Dasgupta et al. | |
| 6,322,921 B1* | 11/2001 | Iwaizono | H01M 2/1241 |
| | | | 429/56 |
| 8,722,224 B2 | 5/2014 | Lee et al. | |
| 8,733,465 B1 | 5/2014 | Flood et al. | |
| 9,093,726 B2 | 7/2015 | Prilutsky et al. | |
| 9,548,616 B2 | 1/2017 | Hermann | |
| 2003/0152829 A1* | 8/2003 | Zhang | H01M 2/0275 |
| | | | 429/153 |
| 2009/0274952 A1* | 11/2009 | Wood | B60L 58/26 |
| | | | 429/99 |
| 2010/0129703 A1* | 5/2010 | Caumont | H01M 10/613 |
| | | | 429/120 |
| 2011/0020678 A1 | 1/2011 | Straubel et al. | |
| 2011/0101919 A1 | 5/2011 | Polk et al. | |
| 2011/0281152 A1 | 11/2011 | He et al. | |
| 2012/0003522 A1* | 1/2012 | Fuhr | H01M 2/1077 |
| | | | 429/120 |
| 2012/0094153 A1 | 4/2012 | Fuller | |
| 2014/0342195 A1 | 11/2014 | Bhola et al. | |
| 2015/0064535 A1 | 3/2015 | Seong et al. | |
| 2015/0111082 A1 | 4/2015 | Sumpf et al. | |
| 2015/0221914 A1 | 8/2015 | Page et al. | |
| 2015/0342092 A1 | 11/2015 | Ramm et al. | |
| 2016/0093842 A1 | 3/2016 | Blanco et al. | |
| 2016/0133901 A1 | 5/2016 | Li et al. | |
| 2016/0254578 A1 | 9/2016 | Liu et al. | |
| 2016/0380247 A1 | 12/2016 | Juzkow et al. | |
| 2017/0005384 A1 | 1/2017 | Harris et al. | |

OTHER PUBLICATIONS

Pending U.S. Appl. No. 15/800,303, filed Nov. 1, 2017, entitled: "Cooled Containment Compartments for Packaged Battery Cells", 25 pages.

McDermed, "Shipping Container R&D Test Plan, R&D Test Plan-Proposed Pyrophobic Shipping Container", MAC-061880-001 Rev C, Jul. 9, 2013, pp. 1-10.

Cleary, "Safety of Lithium Nickel Cobalt Aluminum Oxide Battery Packs in Transit Bus Applications", http://transweb.sjsu.edu/project/1247.html, Publication 12-61, Oct. 2016, pp. 1-4.

Na et al., "Comparison of different Air Cooling Channels for Battery Module", International Journal of Applied Engineering Research ISSN 0973-4562 vol. 11, No. 18 (2016) pp. 9564-9568, Research India Publications, http://www.ripublicaion.com.

\* cited by examiner

CONTAINMENT HEATSINK FOR PACKAGED BATTERY CELLS

FIELD OF THE INVENTION

This disclosure relates generally to packaging battery cells, and in particular, to structures for cooling and containing individually packaged battery cells.

BACKGROUND OF THE INVENTION

Over time, energy density in batteries has increased, while packaging size for the batteries has decreased. Lithium ion batteries are an example of high energy density batteries and have become the preferred battery technology for items such as consumer electronics, electric vehicles, battery backup systems, and systems requiring a mobile and rechargeable power source. A byproduct of high energy density is that lithium ion batteries pose a greater safety risk than lower energy density technologies due to the amount of chemical energy stored in a small package. A mechanism by which high energy density batteries fail energetically is called thermal runaway, a condition where the chemical reaction inside a single cell becomes unstable due to excessive heat, which may be generated by an internal defect or by other means. Thermal runaway causes the single cell to continue to heat up at an ever-accelerating rate until the structural integrity of the single cell is compromised or the single cell combusts.

SUMMARY

One embodiment of the present invention discloses an apparatus for containing packaged battery cells, the apparatus comprising a first structure disposed on a printed circuit board for encasing a first battery cell, the first battery cell being electrically coupled to the circuit board, the first structure includes an external surface and an internal surface defining a first cavity in which the first battery cell is located. The apparatus includes the first cavity located on a bottom surface of the first structure, wherein the bottom surface of the first structure is coupled to a top surface of the printed circuit board. The apparatus further includes a first seal surrounding an area of the first battery cell between the top surface of the printed circuit board coupled to the bottom surface of the first structure. The apparatus further includes a first thermal interface material located in the first cavity, wherein a first portion of the first thermal interface material is thermally coupled to an interior surface of the first cavity and a second portion of the first thermal interface material is thermally coupled to at least a portion of the first battery cell located in the first cavity. The apparatus further includes a plurality of heatsink fins located on the external surface of the first structure.

BRIEF DESCRIPTION OF THE SEVERAL VIEWS OF THE DRAWINGS

The following detailed description, given by way of example and not intended to limit the disclosure solely thereto, will best be appreciated in conjunction with the accompanying drawings, in which.

DETAILED DESCRIPTION

Figure 1:
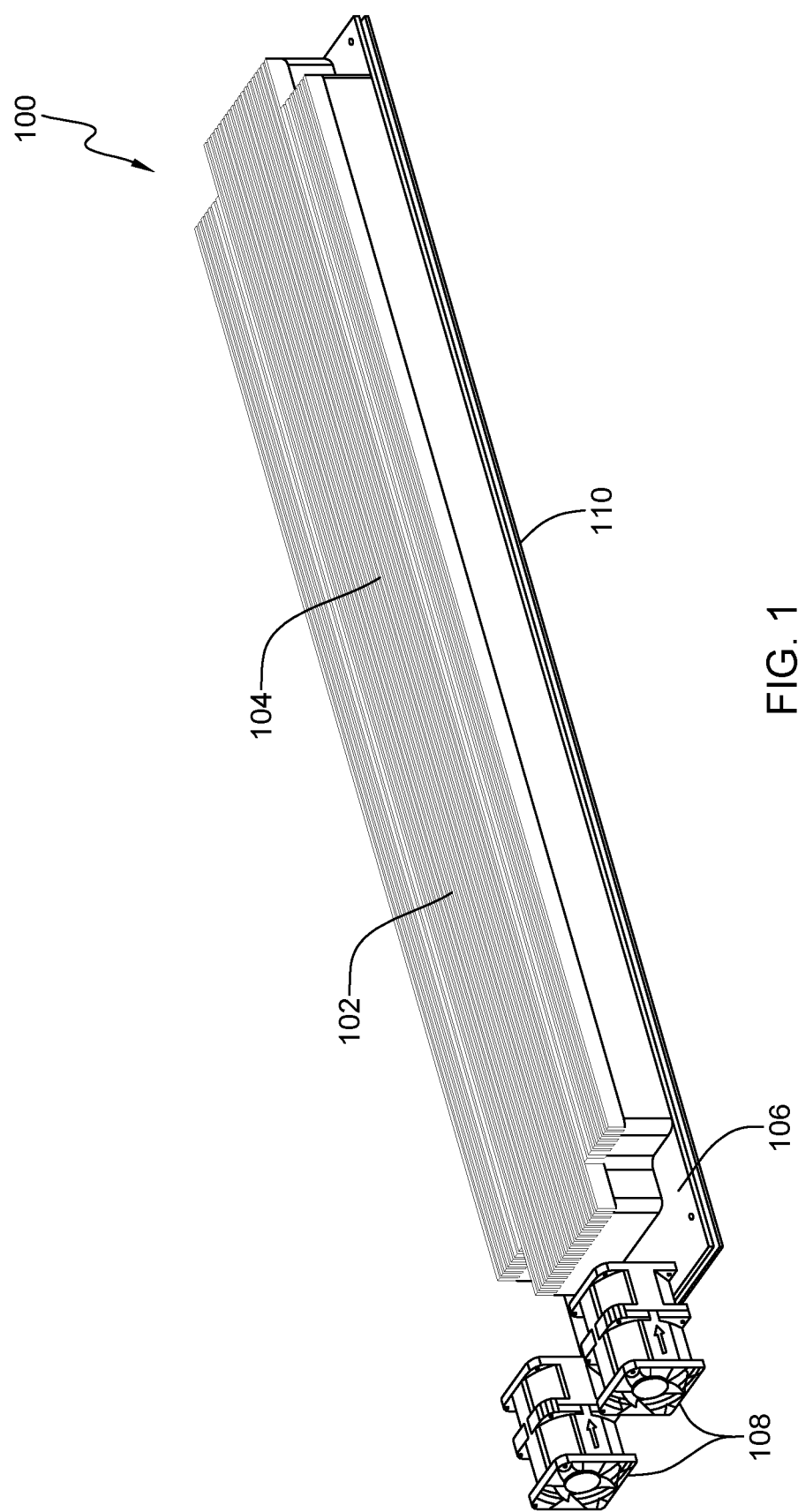
FIG. 1 depicts a battery cell board assembly with a blast plate and containment heatsink, in accordance with an embodiment of the present invention.

Larger battery cell packages containing multiple battery cells are typically cooled utilizing liquid coolant, where the coolant flows through tubing and piping around the battery cells to cool the battery cell package. The coolant draws heat away from the battery cells and allows for a containment unit to be placed around the cells to prevent a thermal runaway event from escaping the confines of the battery cell package. Some larger battery cell packages separate the battery cells into smaller clusters or modules which are isolated, preventing a cascading failure of all the battery cells in the battery cell package. It is atypical to provide cooling to larger battery cell packages utilizing air flow due to the difficulty of containing battery cells. The containment of battery cells prevents an uncontrolled event (e.g., fire) from exiting the battery cell package and causing damage or injury. The containment of a single battery cell prevents a single battery cell thermal runaway event from propagating to surrounding battery cells and creating a thermal runaway event across all the battery cells within the battery cell package.

Embodiments of the present invention provide an apparatus for cooling and containing an array of battery cells in a battery cell package, while utilizing accelerated airflow as a primary cooling method. A containment heatsink with multiple compartments is utilized to isolate and provide cooling to individual or paired battery cells located within each compartment, where the array of battery cells are electrically coupled to a printed circuit board. A top surface of the containment heatsink includes fins for dissipating heat produced by the array of battery cells and a bottom surface includes multiple cavities for isolating individual or paired battery cells. The containment heatsink is coupled to a top surface of the printed circuit board with the electrically coupled array of battery cells, where the individual or paired battery cells are encased between the containment heatsink and the printed circuit board. The individual or paired battery cells are partially encased (e.g., five sides) in the cavity of the containment heatsink, where the printed circuit board provides a boundary (i.e., sixth side) for completely encasing the individual or paired battery cells. Each battery cell or cluster of battery cells, isolated in a compartment of the containment heatsink prevents the propagation of a thermal event to the surrounding array of battery cells (thermal runaway).

A blast plate structure can be utilized in combination with the containment heatsink to provide containment during the thermal event, where the blast structures couples to a bottom surface of the printed circuit board. The blast structure can be of a metal or ceramic material capable of withstanding a force and heat generated during the thermal event occurring in one or more compartments of the containment heatsink that has penetrated the bottom surface of the printed circuit board. A void exists between a top surface of the blast plate structure and a bottom surface of the printed circuit board to allow for the electrical coupling of battery management circuitry such as integrated circuits (ICs), resistors, and field-effect transistors (FETs). Apertures can be incorporated in the printed circuit board for releasing pressure generated by a battery cell experiencing a thermal event in a compartment. The void allows for the pressure generated by the battery to dissipate, prior to the pressurized gas encountering the blast plate structure situated opposite the apertures in the printed circuit board.

The individual or paired battery cells are thermally coupled via a thermal interface material to an inside surface of the compartment. The thermal interface material can be thermally coupled on any inside surface of the compartment depending on the application. For example, if the containment heatsink is of an electrically conductive material, the thermal interface material is thermally coupled to all inside surfaces of the compartment to prevent the battery leads of the battery cells from contacting the conductive containment heatsink. Heat is transferred from the battery cells to the thermal interface material and from the thermal interface material to the containment heatsink. As one or more fans accelerate air towards the containment heatsink, the accelerated air contacts heatsink fins located on a top surface of the containment heatsink and cools the containment heatsink with the array of battery cells encased within. Since the array of battery cells are thermally coupled to the containment heatsink via the thermal interface material, heat can transfer from the battery cell to the heatsink fins. The array of battery cells encased by the containment heatsink are simultaneously contained and cooled utilizing the accelerated air cooling method.

Detailed embodiments of the present invention are disclosed herein with reference to the accompanying drawings; however, it is to be understood that the disclosed embodiments are merely illustrative of potential embodiments of the invention and may take various forms. In addition, each of the examples given in connection with the various embodiments is also intended to be illustrative, and not restrictive. This description is intended to be interpreted merely as a representative basis for teaching one skilled in the art to variously employ the various aspects of the present disclosure. In the description, details of well-known features and techniques may be omitted to avoid unnecessarily obscuring the presented embodiments.

For purposes of the description hereinafter, terms such as "upper", "lower", "right", "left", "vertical", "horizontal", "top", "bottom", and derivatives thereof shall relate to the disclosed structures and methods, as oriented in the drawing figures. Terms such as "above", "overlying", "atop", "on top", "positioned on" or "positioned atop" mean that a first element, such as a first structure, is present on a second element, such as a second structure, wherein intervening elements, such as an interface structure may be present between the first element and the second element. The term "direct contact" means that a first element, such as a first structure, and a second element, such as a second structure, are connected without any intermediary conducting, insulating or semiconductor layers at the interface of the two elements. The term substantially, or substantially similar, refer to instances in which the difference in length, height, or orientation convey no practical difference between the definite recitation (e.g. the phrase sans the substantially similar term), and the substantially similar variations. In one embodiment, substantial (and its derivatives) denote a difference by a generally accepted engineering or manufacturing tolerance for similar devices, up to, for example, 10% deviation in value or 10° deviation in angle.

In the interest of not obscuring the presentation of embodiments of the present invention, in the following detailed description, some processing steps or operations that are known in the art may have been combined together for presentation and for illustration purposes and in some instances may have not been described in detail. In other instances, some processing steps or operations that are known in the art may not be described at all. It should be understood that the following description is rather focused on the distinctive features or elements of various embodiments of the present invention.

Many common fabrication techniques involve securing two objects using an adhesive layer between the objects. Often times the adhesive layer is chosen in an attempt to permanently secure the two objects together. And while this adhesive layer selection may be advantageous for typical usage of the overall product, there may be instances where separation of the joined objects is either desired, or necessary. In such instances, separation of the two objects, without physically damaging either of the objects, may be required so that one or both of the objects may be reused.

FIG. 1 depicts a battery cell board assembly with a blast plate and containment heatsink, in accordance with an embodiment of the present invention. In this embodiment, battery cell board assembly 100 includes containment heatsink 102, heatsink fins 104, and printed circuit board (PCB) 106. Battery cell board assembly 100 includes an array of battery cells spanning the length of PCB 106, where each battery cell is mounted longitudinally relative to a top surface of PCB 106. Each battery cell is encased in a battery cell compartment, discussed in further detail in FIG. 2. A bottom surface of a first end of each battery cell and a top surface of a second end of each battery cell is electrically coupled to a top surface of PCB 106. Sealing each battery cell prevents a thermal event occurring in a single battery cell from propagating to surrounding battery cells (i.e., thermal runaway). In this embodiment, containment heatsink 102 and heatsink fins 104 are a single mountable structure coupled to PCB 106, where the singled mountable structure is placed over the array of battery cells and battery cell components spanning the length of PCB 106 and the single mountable structure couples to a top surface of PCB 106. In an alternative embodiment, containment heatsink 102 and heatsink fins 104 are each distinguishable structures, where containment heatsink 102 and heatsink fins 104 can be assembled prior to coupling to a top surface of PCB 106 or containment heat sink 102 can couple to a top surface of PCB 106 and heatsink fins 104 can couple to a top surface of containment heatsink 102.

A bottom surface of containment heatsink 102 couples to a top surface of PCB 106, where a seal is created around a perimeter of containment heatsink and a seal is created around each battery cell compartment encasing one or more battery cells. A shape and size of containment heatsink 102 is dependent on a number of battery cells coupled to PCB 106. A shape and size of heatsink fins 104 is dependent on cooling requirements for the battery cells coupled to PCB 106. In this embodiment, rows of heatsink fins 104 are orientated longitudinally, where the rows of heatsink fins 104 are parallel to a directional airflow created by fans 108 located at a first end (front portion) of battery cell board assembly 100. Spacing between the rows of heatsink fins 104 can vary along the length of containment heatsink 104, where a spacing between the rows of heatsink fins 104 is narrower at a first end (front portion) of containment heatsink 102 than a spacing between the rows of heatsink fins 104 at a second end (rear portion) of containment heatsink 102. A height for each row of heatsink fins 104 can vary along the length of containment heatsink 104, where a height of heatsink fins 104 is shorter at the first end of containment heatsink 102 than a height of heatsink fins 104 at the second end of containment heat sink 102. Variations of height and spacing between rows of heatsink fins 104 addresses increased cooling requirements along the length of containment heatsink 102, towards the second end of containment heatsink 102.

Blast plate structure 110 is coupled to a bottom surface of the PCB 106, where a void is present between the bottom surface of PCB 106 and blast plate structure 110. The void allows for the placement of electrical components on the bottom surface of PCB 106 and the void allows for pressure relief for the battery cells through apertures in PCB 106. Each battery cell compartment includes one or more dedicated apertures in PCB 106 to allow for gas to flow out through the battery cell during a high-pressure event, through the one or more apertures in PCB 106, and out into the void between PCB 106 and blast plate structure 110. In another embodiment, each battery cell compartment includes one or more dedicated apertures in containment heatsink 102 to allow for gas to flow out through the battery cell during a high-pressure event, through the one or more apertures in containment heatsink 102, and away from the surrounding battery cell compartments.

For illustration purposes, FIG. 1 does not include an enclosure for battery cell board assembly 100, where the enclosure encompasses battery cell board assembly 100. Cooling fans 108 located at the first end (front portion) of battery cell board assembly 100 accelerates air towards containment heat sink 102 with heatsink fins 104, and exhausts air away from containment heat sink 102 with heatsink fins 104 at a second end (rear portion) of battery cell board assembly 100. The enclosure at the first end of battery cell board assembly 100 includes inlet apertures for air intake and the enclosure at the second end of battery cell board assembly 100 includes outlet apertures for exhausting air away from battery cell board assembly 100.

Figure 2:
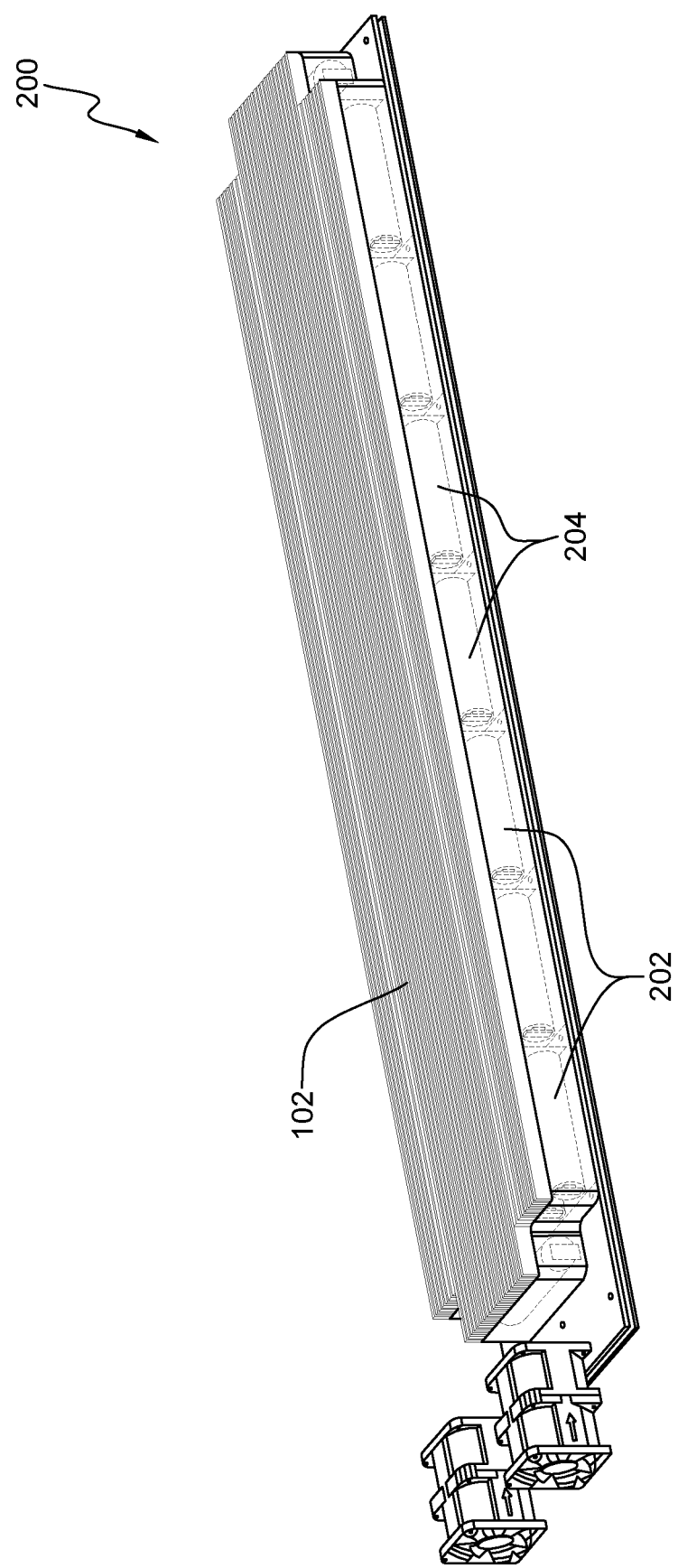
FIG. 2 depicts a transparent view of a containment heatsink from FIG. 1, in accordance with an embodiment of the present invention.

FIG. 2 depicts a transparent view of a containment heatsink from FIG. 1, in accordance with an embodiment of the present invention. For illustration purposes, containment heatsink 102 is shown as transparent for visualization of content encased within. In this embodiment, each battery cell compartment 202 positioned along the length of transparent battery cell board assembly 200, includes a pair of battery cells 204. The two battery cell compartments 202 positioned at the first end and the second end of containment heatsink 102, are positioned along the width of transparent battery cell board assembly 200 and each of the two battery compartments include a single battery cell 204. An orientation of battery cells 204 and a number of battery cells 204 in a single battery cell compartment 202 is dependent on cooling, containment, and packaging requirements of a specific application.

Figure 3:
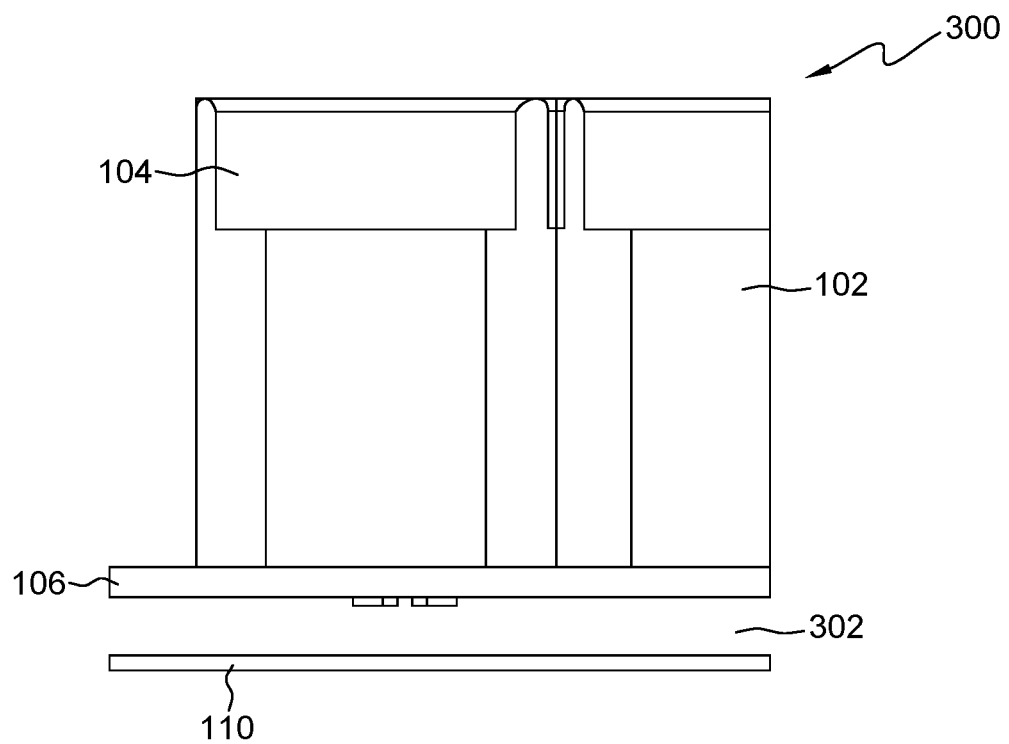
FIG. 3 depicts an enhanced view of a battery cell board assembly with a blast plate and containment heatsink, in accordance with one embodiment of the present invention.

FIG. 3 depicts an enhanced view of a battery cell board assembly with a blast plate and containment heatsink, in accordance with one embodiment of the present invention. Enhanced view of containment heat sink 300 illustrates containment heatsink 102 with heatsink fins 104 coupled to PCB 106. As previously discussed, blast plate structure 110 is coupled to a bottom surface of the PCB 106, where void 302 is present between the bottom surface of PCB 106 and blast plate structure 110. Void 302 allows for the placement of electrical components on the bottom surface of PCB 106 and void 302 allows for pressure relief for the battery cells through one or more apertures in PCB 106. Blast plate structure 110 in combination with PCB 106, provides protection on a bottom surface of the containment heatsink 102 with battery cell compartments that encase the battery cells electrically coupled to PCB 106.

A top surface of blast plate structure 110 can couple to a bottom surface PCB 106 utilizing multiple member structures, where each of the multiple member structures are perpendicular to the top surface of blast plate structure 110 and bottom surface of PCB 106. In one embodiment, the multiple member structures for mounting blast plate structure 110 can be incorporated into a mold of blast plate structure 110, resulting in a single blast plate structure 110 with protruding member structures. In another embodiment, the multiple member structures for mounting blast plate structure can be incorporated into PCB 106, resulting in a single PCB 106 structure with protruding members for mounting blast plate structure 110. In yet another embodiment, containment heatsink 102 includes the multiple member structures which pass through a top surface of PCB 106 and exit a bottom surface of PCB 106, where each end of the multiple member structures couple to blast plate structure 110.

Figure 4:
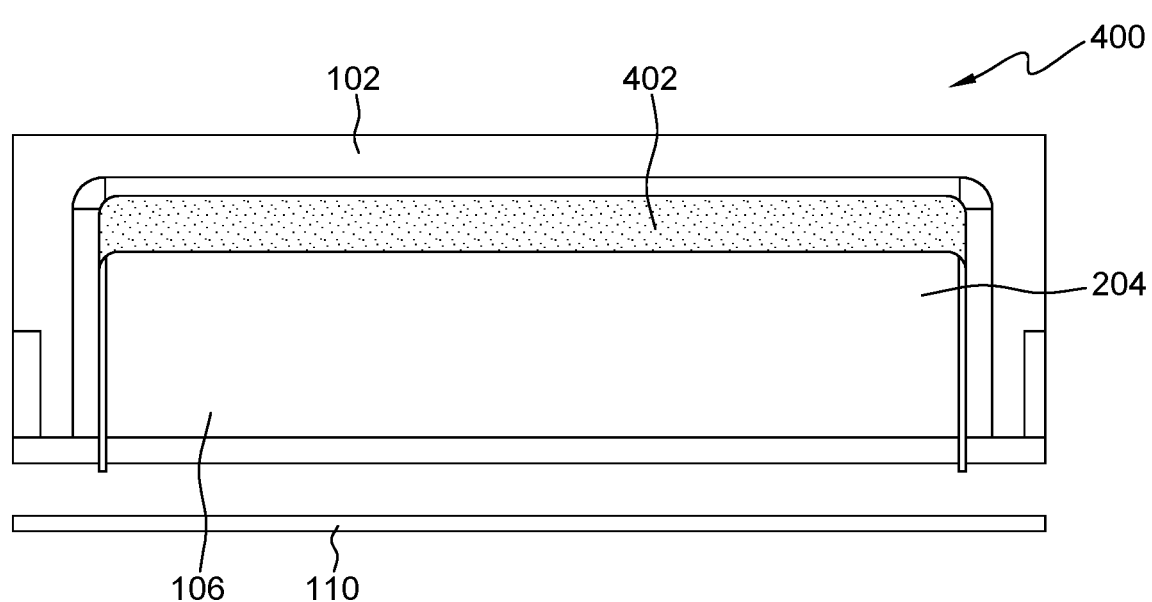
FIG. 4 depicts an individual battery cell located within a single compartment of a containment heatsink, in accordance with one embodiment of the present invention.

FIG. 4 depicts an individual battery cell located within a single compartment of a containment heatsink, in accordance with one embodiment of the present invention. Enhanced battery compartment view 400 illustrates a side view of battery cell 204 encased by containment heatsink 102 and PCB 106. Battery cell 204 is electrically coupled lengthwise to PCB 106 through electrical leads at a first end and a second end of battery cell 204. Thermal interface material 402 is positioned between a first portion of battery cell 204 and containment heatsink 102, where the first portion of battery cell 204 is positioned opposite of a top surface of a battery cell compartment. Alternatively, thermal interface material 402 can be positioned between all surfaces of battery cell 402 opposite the battery cell compartment of containment heatsink 102. Thermal interface material 402 prevents electrical conduction between battery cell 204 and containment heatsink 102 and thermal interface material 402 provides a thermal path for heat to flow from battery cell 204 to containment heatsink 102 and from containment heatsink 102 to heatsink fins 104 (not illustrated in FIG. 4). Containment heatsink 102 can couple to PCB 106 utilizing a heat resistant adhesive, such that the heat resistant adhesive creates a seal surrounding battery cell 204 preventing gasses from escaping between containment heatsink 102 and PCB 106. Alternatively, containment heatsink 102 can couple to PCB 106 with multiple fasteners (e.g., screws) and heat resistant gaskets, such that the heat resistant gasket creates a seal surrounding battery cell 204 preventing gasses from escaping between containment heatsink 102 and PCB 106.

Figure 5:
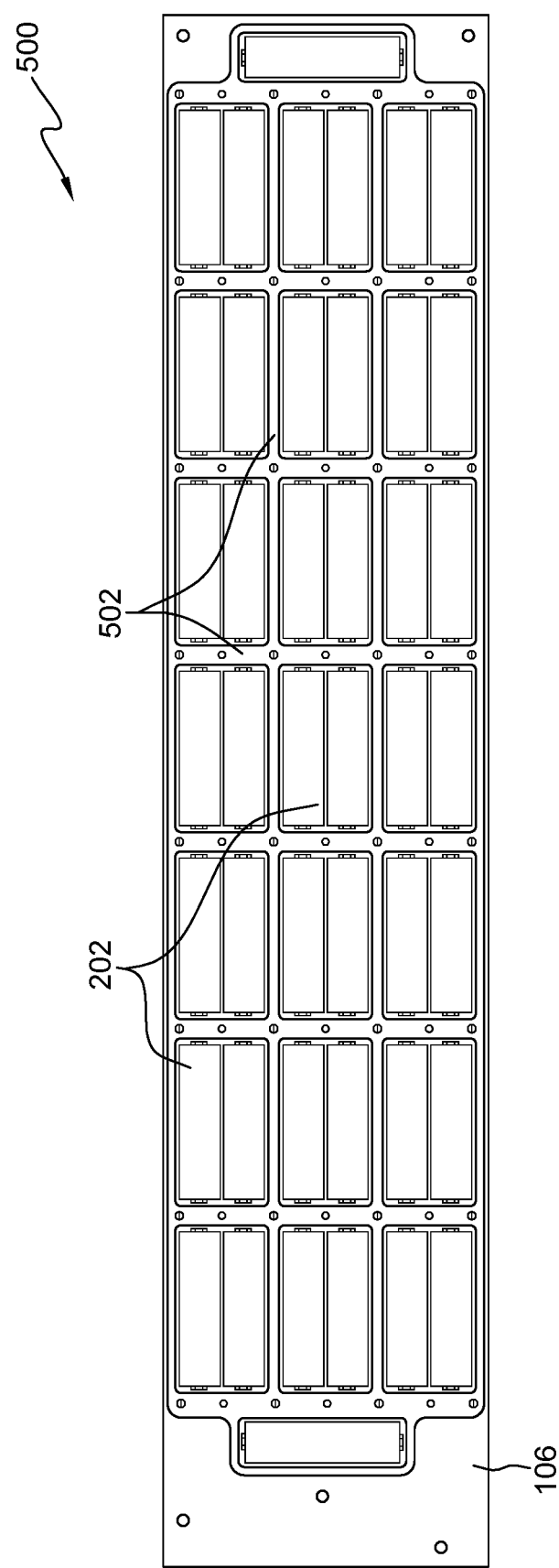
FIG. 5 depicts a transparent bottom view of paired battery cells in compartments of a containment heatsink, in accordance with one embodiment of the present invention.

FIG. 5 depicts a transparent bottom view of paired battery cells in compartments of a containment heatsink, in accordance with one embodiment of the present invention. Transparent printed circuit board view 500 illustrates a bottom view of PCB 106 with battery cell compartments 202 encasing battery cells 204. In this embodiment, each battery cell compartment 202 includes a pair of battery cells 204, where voids 502 exist between each battery cell compartment 202 to isolate each paring of battery cells 204. In the embodiment where containment heatsink 102 is coupled to PCB 106 utilizing fasteners, one or more heat resistant gaskets would be situated in voids 502 between containment heatsink 102 and PCB 106. In the embodiment where containment heatsink 102 is coupled to PCB 106 utilizing a heat resistant adhesive, the heat resistant adhesive would be situated in voids 502.

Figure 6:
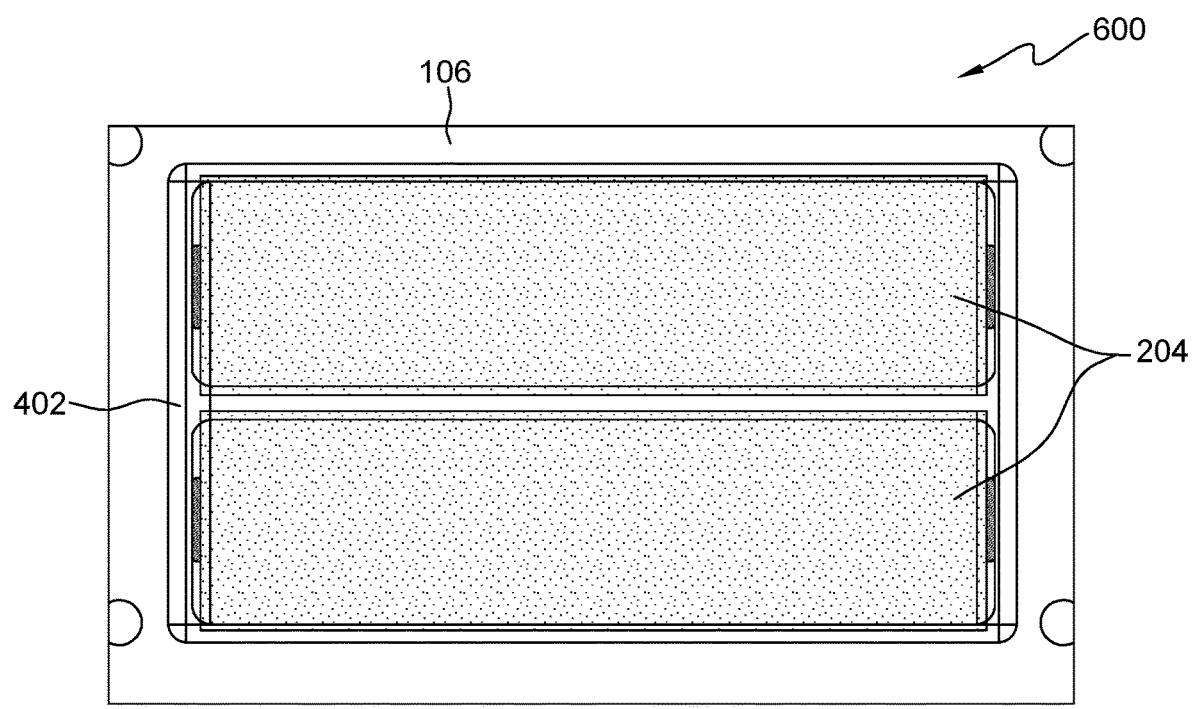
FIG. 6 depicts a transparent top view of paired battery cells in a single compartment of a containment heatsink, in accordance with one embodiment of the present invention.

FIG. 6 depicts a transparent top view of paired battery cells in a single compartment of a containment heatsink, in accordance with one embodiment of the present invention. Transparent battery cell compartment 600 illustrates a top view of battery cell compartment 202 encasing paired battery cells 204. In this embodiment, the paired battery cells 204 are mounted lengthwise on PCB 106, with thermal interface material 402 situated on a top surface of the paired battery cells 204. Battery cell compartment 202 includes multiple apertures in PCB 106 for venting gasses produced by the paired battery cells 204 during a thermal event, where the multiple apertures in PCB 106 are discussed in further detail with regards to FIG. 7. In an alternative embodiment, multiple apertures are located on containment heatsink 102 for battery cell compartment 202, where the multiple apertures are located in between heatsink fins 104 of containment heatsink 102.

Figure 7:
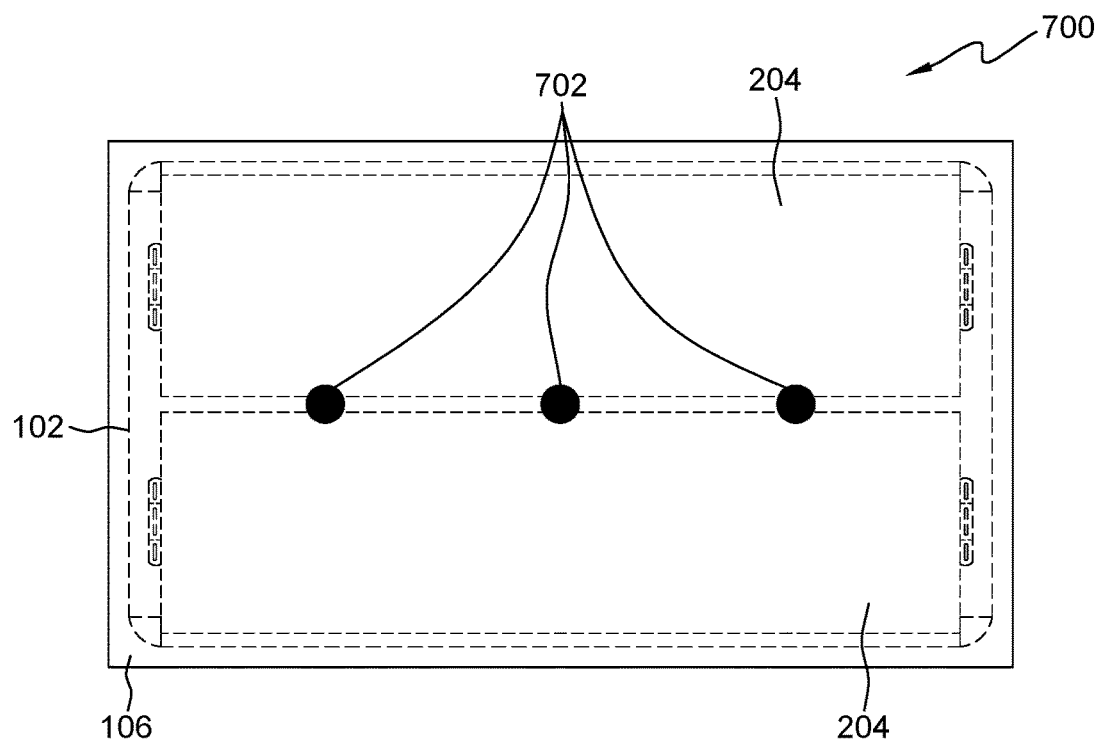
FIG. 7 depicts a transparent bottom view of paired battery cells in a single compartment of a containment heatsink, in accordance with one embodiment of the present invention.

FIG. 7 depicts a transparent bottom view of paired battery cells in a single compartment of a containment heatsink, in accordance with one embodiment of the present invention. Transparent printed circuit board 700 illustrates PCB 106 with apertures 702 for venting gases produced by paired battery cells 204 in battery cell compartment 202. In this embodiment, battery cell compartment 202 includes apertures 702 in PCB 106 for venting gasses produced by the paired battery cells 204 during a thermal event. Battery cell compartment 202 of containment heat sink 102 prevents gasses produced by the paired battery cells 204 from propagating to surrounding battery cells 204 encased in respective battery cell compartments 202. A size and location of apertures 702 is dependent on an amount of pressure generated in battery cell compartment 202 when the paired battery cells 204 experience a thermal event. Apertures 702 are sized such that gasses produced by the paired battery cells 204 experiencing a thermal event, is gradually released without damaging portions of PCB 106 located beneath surrounding paired battery cells 204. The gradual release of gasses from the battery cell compartment prevents the thermal event from propagating to the surrounding paired battery cells 204, thus preventing a thermal runaway event.

The terminology used herein is for the purpose of describing particular embodiments only and is not intended to be limiting to the invention. As used herein, the singular forms "a", "an" and "the" are intended to include the plural forms as well, unless the context clearly indicates otherwise.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiment, the practical application or technical improvement over technologies found in the marketplace, or to enable other of ordinary skill in the art to understand the embodiments disclosed herein. It is therefore intended that the present invention not be limited to the exact forms and details described and illustrated but fall within the scope of the appended claims.

What is claimed is:

1. An apparatus for cooling and containing packaged battery cells, the apparatus comprising:
a first structure disposed on a printed circuit board, the first structure and the printed circuit board encase a first battery cell, the first battery cell being electrically coupled to the printed circuit board, the first structure including an external surface and an internal surface defining a first compartment in which the first battery cell is located;
the first compartment located on a bottom surface of the first structure, wherein the bottom surface of the first structure is coupled to a top surface of the printed circuit board;
a first seal surrounding an area of the first battery cell between the top surface of the printed circuit board coupled to the bottom surface of the first structure;
a first thermal interface material located in the first compartment, wherein a first portion of the first thermal interface material is thermally coupled to an interior surface of the first compartment and a second portion of the first thermal interface material is thermally coupled to at least a portion of the first battery cell located in the first compartment;
one or more apertures on the printed circuit board, wherein the one or more apertures are located within an area of the first compartment configured to provide pressure relief for the first compartment in which the first battery cell is located;
a first blast plate structure coupled to the bottom surface of the first structure, wherein the bottom surface of the first structure includes one or more protruding members extending through the printed circuit board, for coupling the first blast plate structure, wherein a first void separates a bottom surface of the printed circuit board and a top surface of the first blast plate structure; and
a plurality of heatsink fins located on the external surface of the first structure.

2. The apparatus of claim 1, wherein the first seal is a heat resistant gasket coupled between the printed circuit board and the surrounding surface of the first compartment.

3. The apparatus of claim 1, wherein the first seal is a heat resistant adhesive disposed between the printed circuit board and the surrounding surface of the first compartment.

4. The apparatus of claim 2, wherein the printed circuit board is coupled to the first structure via one or more fasteners extending through the heat resistant gasket.

5. The apparatus of claim 3, wherein the printed circuit board is coupled to the first structure via one or more fasteners extending through the heat resistant adhesive.

6. The apparatus of claim 1, further comprising:
one or more apertures located on the top surface of the first structure between the plurality of heatsink fins, wherein the one or more apertures are located within an area of first compartment.

7. The apparatus of claim 1, further comprising:
a second blast plate structure coupled to the bottom surface of the printed circuit board, wherein the bottom surface of the printed circuit board includes one or more protruding members for coupling to the second blast plate structure.

8. The apparatus of claim 1, wherein the first blast plate structure comprises a ceramic material.

9. The apparatus of claim 7, wherein the second blast plate structure comprises a ceramic material.

10. The apparatus of claim 1, further comprising:
a second compartment located on the bottom surface of the first structure for partially encasing a second battery cell electrically coupled to the printed circuit board; and
a second thermal interface material situated in the second compartment, wherein a first portion of the second thermal interface material is thermally coupled to an interior surface of the second compartment and a second portion of the second thermal interface material is thermally coupled to at least a portion of the second battery cell located in the second compartment;
wherein the printed circuit board is coupled to the first structure.

11. The apparatus of claim 10, wherein a first void in the first structure separates the first compartment and the second compartment.

12. The apparatus of claim 10, wherein a first portion of the plurality of heatsink fins are located above the first compartment and a second portion of the plurality of heatsink fins are located above the second compartment.

13. The apparatus of claim 1, wherein the first battery cell electrically coupled to the printed circuit board is longitudinally oriented relative to the top surface of the printed circuit board.

* * * * *